(12) United States Patent
Rabinowitz (10) Patent No.: US 7,247,790 B2
(45) Date of Patent: Jul. 24, 2007

(54) SPINNING CONCENTRATOR ENHANCED SOLAR ENERGY ALTERNATING CURRENT PRODUCTION

(76) Inventor: Mario Rabinowitz, 715 Lakemead Way, Redwood City, CA (US) 94062-3922

( * ) Notice: Subject to any disclaimer, the term of this patent is extended or adjusted under 35 U.S.C. 154(b) by 795 days.

(21) Appl. No.: 10/639,011

(22) Filed: Aug. 11, 2003

(65) Prior Publication Data

US 2005/0034750 A1    Feb. 17, 2005

(51) Int. Cl.
*H01L 31/052* (2006.01)
(52) U.S. Cl. .................. 136/246; 136/243; 359/851; 359/872
(58) Field of Classification Search ............... 136/243, 136/246; 309/851, 872
See application file for complete search history.

(56) References Cited

U.S. PATENT DOCUMENTS

| 3,670,323 A | 6/1972 | Sobel and Markin ... 340/324 R |
| 4,408,206 A * | 10/1983 | Fitch et al. ................. 342/352 |
| 5,754,332 A | 5/1998 | Crowley ..................... 359/296 |
| 5,808,783 A | 9/1998 | Crowley ..................... 359/296 |
| 5,815,306 A | 9/1998 | Sheridon et al. ............ 359/296 |
| 5,914,805 A | 6/1999 | Crowley ..................... 359/296 |
| 6,120,588 A | 9/2000 | Jacobson ................ 106/31.16 |
| 6,120,839 A | 9/2000 | Cominsky et al. ....... 427/213.3 |
| 6,192,890 B1 | 2/2001 | Levy et al. ................. 128/899 |
| 6,197,228 B1 | 3/2001 | Sheridon .................... 264/1.36 |
| 6,211,998 B1 | 4/2001 | Sheridon .................... 359/296 |
| 6,222,513 B1 | 4/2001 | Howard et al. ............... 345/84 |
| 6,243,058 B1 | 6/2001 | Mikkelsen et al. ........... 345/84 |
| 6,249,271 B1 | 6/2001 | Albert et al. ............... 345/107 |
| 6,262,707 B1 | 7/2001 | Sheridon .................... 345/111 |
| 6,323,989 B1 | 11/2001 | Jacobson et al. ........... 359/296 |
| 6,335,818 B1 | 1/2002 | Torres ........................ 359/296 |
| 6,570,700 B2 | 5/2003 | Engler et al. ............... 359/296 |
| 6,612,705 B1 * | 9/2003 | Davidson et al. ........... 359/851 |
| 2002/0131151 A1 | 9/2002 | Engler et al. ............... 359/296 |

* cited by examiner

*Primary Examiner*—Nam Nguyen
*Assistant Examiner*—Anthony Fick (57) ABSTRACT

Due to an ever growing shortage of conventional energy sources, there is an increasingly intense interest in harnessing solar energy. This invention deals with method and apparatus for the direct conversion of solar energy to alternating current power by an active spinning mini-optics system. A limiting factor in the utilization of solar energy in the past has been the high cost of power conversion from dc to ac. By directly producing alternating current power, this invention substantially reduces the cost of generating photovoltaic electricity. This system utilizes a dynamic spinning ensemble of mini-mirrors to both concentrate and modulate rays from the sun onto a photovoltaic collector array. The focusing with superimposed spinning action produces single phase and multiphase alternating current (ac) with substantially higher power output than the direct current (dc) power resulting from the direct incidence of sunlight on the photovoltaic collector.

22 Claims, 4 Drawing Sheets

SPINNING CONCENTRATOR ENHANCED SOLAR ENERGY ALTERNATING CURRENT PRODUCTION

BACKGROUND OF THE INVENTION

1. Field of the Invention

This invention relates generally to method and apparatus for the direct conversion of solar energy to alternating current power by an active spinning mini-optics system. This system utilizes a dynamic spinning ensemble of mini-mirrors to both concentrate and modulate rays from the sun onto a photovoltaic collector array. The spinning of mini-reflectors with superimposed dc bias produces alternating current (ac) with substantially higher power output than the direct current (dc) power resulting from the direct incidence of sunlight on the photovoltaic collector. Due to an ever growing shortage of conventional energy sources, there is an increasingly intense interest in harnessing solar energy. A limiting factor in the utilization of solar energy has been the high cost of power conversion from dc to ac.

This invention provides a low cost means for achieving affordable solar energy by greatly reducing the cost of solar concentrators which increase (concentrate) the density of solar energy incident on the solar energy converter and concurrently produce ac. For example, for the purpose of generating electricity, a large area of expensive solar cells and their dc to ac conversion equipment may be replaced by a small area of high-grade photovoltaic solar cells operating in conjunction with the inexpensive intelligent spinning mini-optics concentrator of this invention. Thus the instant invention can contribute to the goal of achieving environmentally clean energy on a large enough scale to be competitive with conventional energy sources.

This invention is less expensive than conventional solar photovoltaic systems for three reasons. First it produces ac directly without the need for expensive auxiliary dc to ac conversion equipment. Second due to miniaturization, the amount of material needed for the concentrating optical system is much less. Third, because the mini-optical solar concentrator is light-weight and flexible, it can easily be attached to existing structures. This is a great economic advantage over all existing solar concentrators which require the construction of a separate structure and large guidance system to support and orient them to intercept and properly reflect sunlight. Such separate structures must be able to survive gusts, windstorms, earthquakes, etc. The instant invention utilizes existing structures which are already capable of withstanding such inclement vicissitudes of nature.

2. Description of the Prior Art

The inventor of this instant invention is the co-inventor of the patent application entitled, "Mini-Optics Solar Energy Concentrator" which was allowed for U.S. Patent on Apr. 22, 2003, but which has not issued as yet. This prior art application does not in any way deal with the production of alternating current power.

There are many prior art patents that deal with twisting balls (gyricon) displays or separable particle displays. These may be broadly catagorized as permanently pre-formed, and formable surface balls. Electric or magnetic fields are used to orient or move these polarized or charged balls. None of the prior art utilizes the balls to optically concentrate (focus) and modulate light as in the instant invention. Furthermore the prior art neither teaches nor anticipates application of the conversion of solar energy to electricity (ac or dc) or any other form of energy. These verities are evident from an examination of the prior art. A large representative sample of the prior art will now be enumerated and described. This together with the references contained therein constitutes a comprehensive compendium of the prior art.

U.S. Pat. No. 5,754,332 issued to J. M. Crowley on May 19, 1998 deals with gyricon bi-colored balls whose reflectance is comparable with white paper. The object is to produce a monolayer gyricon display.

U.S. Pat. No. 5,808,783 issued to J. M. Crowley on Sep. 15, 1998 deals with gyricon bi-colored balls "having superior reflectance characteristics comparing favorably with those of white paper." Again the objective is a display application.

U.S. Pat. No. 5,914,805 issued to J. M. Crowley on Jun. 22, 1999 utilizes two sets of gyricon bi-colored balls "having superior reflectance characteristics comparing favorably with those of white paper" for display purposes.

U.S. Pat. No. 6,055,091 issued to N. K. Sheridon and J. M. Crowley on Apr. 25, 2000 utilizes gyricon bi-colored cylinders. Again the objective is a display application.

U.S. Pat. No. 6,072,621 issued to E. Kishi, T. Yagi and T. Ikeda on Jun. 6, 2000 utilizes sets of different mono-colored polarized balls which are separable for a display device.

U.S. Pat. No. 6,097,531 issued to N. K. Sheridon on Aug. 1, 2000 teaches a method for making magnetized elements (balls or cylinders) for a gyricon display.

U.S. Pat. No. 6,120,588 issued to J. M. Jacobson on Sep. 19, 2000 describes a display device which uses mono-colored elements that are electronically addressable to change the pattern of the display.

U.S. Pat. No. 6,174,153 issued to N. K. Sheridon on Jan. 16, 2001 teaches apparatus for the purpose of a gyricon display.

U.S. Pat. No. 6,192.890 B1 issued to D. H. Levy and J. -P. F. Cherry on Feb. 27, 2001 is for a changeable tattoo display using magnetic or electric fields to manipulate particles in the display.

U.S. Pat. No. 6,211,998 B1 issued to N. K. Sheridon on Apr. 3, 2001 teaches a method of addressing a display by a combination of magnetic and electric means. U.S. Pat. No. 6,262,707 B1 issued to N. K. Sheridon on Jul. 17, 2001 has a similar teaching for a gyricon display.

A large number of prior art devices have been described, all of which are directed at addressing and changing the pattern of a display device. While there are other such prior art teachings, none of them teaches or anticipates the instant invention.

DEFINITIONS

"Bipolar" refers herein to either a magnetic assemblage with the two poles north and south, or an electric system with + and − charges separated as in an electret.

"Collector" as used herein denotes any device for the conversion of solar energy into electricity.

"Elastomer" is a material such as synthetic rubber or plastic, which at ordinary temperatures can be stretched substantially under low stress, and upon immediate release of the stress, will return with force to approximately its original length.

"Electret" refers to a solid dielectric possessing persistent electric polarization, by virtue of a long time constant for decay of charge separation.

"Electrophoresis or Electrophoretic" is an electrochemical process in which colloidal particles or macromolecules with a net electric charge migrate in a solution under the influence of an electric current. It is also known as cataphoresis.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. The tracking-focussing-spinning property of an ensemble of tiny elements which make up the ac spinning solar concentrator are an essential feature of the instant invention.

"Heliostat" denotes a clock-driven mounting for automatically and continuously pointing apparatus in the direction of the sun.

"Immiscible" herein refers to two fluids which are incapable of mixing.

"Monopolar" as used herein denotes mono-charged optical elements that are controlled in the non-gyricon mode such as the electrophoretic mode.

"Multiphase" herein refers to two or more alternating current phases. For example, ordinary household 110 volt power is single-phase ac, and ordinarily 220 volt power is three-phase ac.

"Oscillation" herein refers to the rapid alternation of opening (making transparent) and forming (making) of a reflecting surface.

"Photovoltaic" refers to the production of a voltage in a nonhomogeneous semiconductor, such as silicon, by the absorption of electromagnetic radiation such as light. A photovoltaic cell consists of an np junction between an n-type material and a p-type material. In the n-type material, conduction is due to electrons. In the p-type material, conduction is due to positive holes. The released charge flows as current in an external circuit without the need for a battery. If the external circuit is broken, an open-circuit photovoltage appears at the break which depends on the incident radiation. A similar effect occurs in some complex electrolytic systems.

"Polar gradient" as used herein relates to magnetic optical elements that are controlled in the non-gyricon mode such as in the magnetic field gradient mode.

"Rayleigh limit" relates to the optical limit of resolution which can be used to determine the smallest size of the elements that constitute a mini-mirror. Lord Rayleigh discovered this limit from a study of the appearance of the diffraction patterns of closely spaced point sources.

"Rotation" herein refers to turning each reflector about an axis to track the light source and focus the reflected light onto a collector.

"Spinning" herein refers to rapidly revolving, twirling, or whirling each reflector to modulate the reflected light reaching the collector.

"Spin glass" refers to a wide variety of materials which contain interacting atomic magnetic moments. They possess a form of disorder, in which the magnetic susceptability undergoes an abrupt change at what is called the freezing temperature for the spin system.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

"Translucent" as used herein refers to materials that pass light of only certain wavelengths so that the transmitted light is colored.

SUMMARY OF THE INVENTION

There are many aspects and applications of this invention. Primarily this invention deals with the broad general concept of method and apparatus for focussing and modulating light for the direct production of ac power. A particularly important application is the focussing of sunlight for electric power production and conversion.

It is a general object of this invention to provide a focussing/spinning planar mini-optic system for reflecting modulated light with a substantially higher power density than the incident light.

One object is to provide an inexpensive, light-weight, and flexible spinning mini-optical light concentrator that can easily be attached to existing structures, and thus does not require the construction of a superstructure of its own.

Another objective is to provide an ac solar energy conversion system that is not only low capital cost, but that is also inexpensive to install.

A particularly important object is to provide a unique tracking and focussing spinning system for ac solar power conversion.

Another object is to provide a fluid for lubricating the mini-mirror elements so that they may rotate freely.

Another object is to provide an inexpensive system for ac photovoltaic conversion.

Another objective is to provide daily ac peaking power when the load is highest on the conventional power grid.

Another objective is to provide ac electricity to remote villages or rural settlements.

Another objective is to provide ac electricity for communications installations.

Another object is to provide large-scale environmentally clean energy.

Another objective is to help in the industrialization of developing countries.

Another object is to provide a low-cost, tough, light-weight, concentrated efficient solar ac energy converter that is highly portable.

Another objective is to provide a minitiarized planar spinning heliostat concentrator that can either track the sun directly, or indirectly follow the sun with a photomultiplier which searches for a maximum output from the collector.

Another object is to provide a portable system that can easily go anywhere man can go, to track, concentrate the sun's energy, and directly produce ac.

Other objects and advantages of the invention will be apparent in a description of specific embodiments thereof, given by way of example only, to enable one skilled in the art to readily practice the invention as described hereinafter with reference to the accompanying drawings.

In accordance with the illustrated preferred embodiments, method and apparatus are presented that are capable of producing ac and by maintaining a high concentration of light relative to the original source such as sunlight. The various embodiments are capable of producing single-phase or multi-phase ac.

DETAILED DESCRIPTION OF THE PRESENTLY PREFERRED EMBODIMENTS

Figure 1:
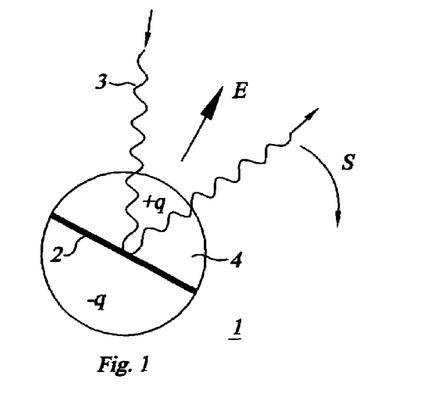
FIG. 1 is a cross-sectional view of an electrically charged bipolar ball with an equatorial flat reflecting surface. This ball is one of a multitude of optical elements which track the sun and focus the sunlight onto a collector, and by spinning they modulate the sun's energy reaching the collector.

FIG. 1 shows a rotatable element 1 of a focussing planar mini-mirror with an equatorial flat reflecting surface 2 which reflects a ray of sunlight 3. The reflecting surface 2 preferably reflects on both sides. The element 1 shown is a cross-sectional view of an electrically charged bipolar spheroid 4 with charge +q in one hemisphere and charge −q in the opposite hemisphere, that is operated in the well-known electrical gyricon mode. This spheroid 4 is one of a multitude of rotatable optical elements 1 which track the sun and focus the sunlight onto a collector by means of an electric field E. A charged electric dipole may also be entirely present in only one hemisphere for the purposes of tracking the sun and/or spinning. Once the primary orientation of each reflecting surface 2 is determined, the direction of the electric field can be rapidly rotated about the primary orientation causing the elements 1 to spin as shown by the curved arrow labeled S.

Figure 2:
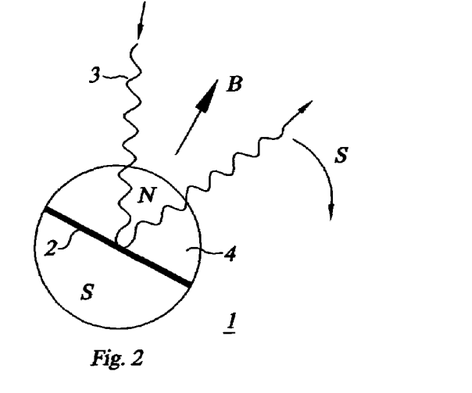
FIG. 2 is a cross-sectional view of a magnetically charged bipolar ball with an equatorial flat reflecting surface. This ball is one of a multitude of optical elements, which track the sun and focus the sun's light beam onto a collector, and by spinning they modulate the sun's energy reaching the collector.

FIG. 2 shows a rotatable element 1 of a focussing planar mini-mirror with a flat equatorial reflecting surface 2 which reflects a ray of sunlight 3. The reflecting surface 2 preferably reflects on both sides. The element 1 shown is a cross-sectional view of a magnetically charged bipolar spheroid 4 with north magnetic field N in one hemisphere and south magnetic field S in the other hemisphere, that is operated in the well-known magnetic gyricon mode. This spheroid 4 is one of a multitude of rotatable optical elements 1 which track the sun and focus the sun's light beam onto a collector by means of a magnetic field B. The magnetic dipole may also be entirely present in only one hemisphere for the purposes of tracking the sun and/or spinning. Once the primary orientation of each reflecting surface 2 is determined, the direction of the magnetic field can be rapidly rotated about the primary orientation causing the elements 1 to spin as shown by the curved arrow labeled S.

Figure 3:
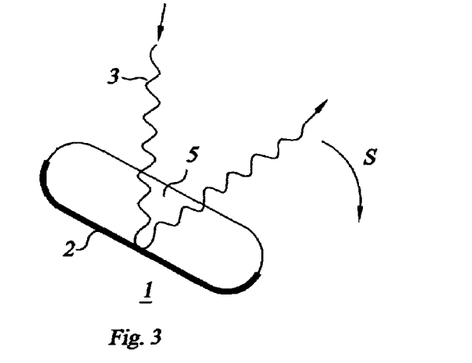
FIG. 3 is a cross-sectional view of a circular disk with a backside-reflecting surface. This disk is one of a multitude of optical elements which track the sun and focus the sunlight onto a collector, and by spinning modulate the sun's energy reaching the collector.

FIG. 3 shows a rotatable element 1 of a focussing planar mini-mirror with a backside reflecting surface 2 which reflects a light ray 3. The reflecting surface 2 preferably reflects on both sides. The element 1 shown is a cross-sectional view of a circular disk 5 with rounded edges, that is operated in any of the well-known modes, such as gyricon, electrical monopolar, magnetic, polar gradient, etc. This disk 5 is one of a multitude of rotatable optical elements 1 which track the sun and focus the sun's rays onto a collector by means of an electric field or magnetic field, or combination thereof. Once the primary orientation of each reflecting surface 2 is determined, the direction of the magnetic field can be rapidly rotated about the primary orientation causing the elements 1 to spin as shown by the curved arrow labeled S.

Figure 4:
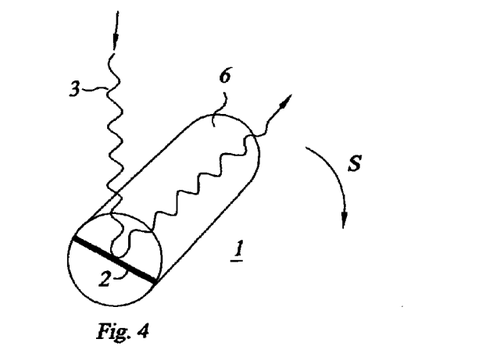
FIG. 4 is a cross-sectional view of a cylinder with an internal flat reflecting surface. This cylinder is one of a multitude of optical elements which track the sun, and focus the sun's light beam onto a collector, and by spinning modulate the sun's energy reaching the collector.

FIG. 4 shows a rotatable element 1 of a focussing planar mini-mirror with an internal flat reflecting surface 2 in the plane of the hemicylinders which reflects a ray of sunlight 3. The reflecting surface 2 preferably reflects on both sides. The element 1 shown is a cross-sectional view of a cylinder 6 that is operated in any of the well-known modes, such as gyricon, electrical monopolar, magnetic, polar gradient, etc. This cylinder 6 is one of a multitude of rotatable optical elements 1 which track the sun and focus the sun's light beam onto a collector by means of an electric field or magnetic field, or combination thereof. Once the primary orientation of each reflecting surface 2 is determined, the direction of the magnetic field can be rapidly rotated about the primary orientation causing the elements 1 to spin as shown by the curved arrow labeled S.

In the case of elements as shown in FIGS. 1-5, the material of element 1 needs to be clear or transparent so the incident light can easily reach the reflecting surface 2.

Figure 5:
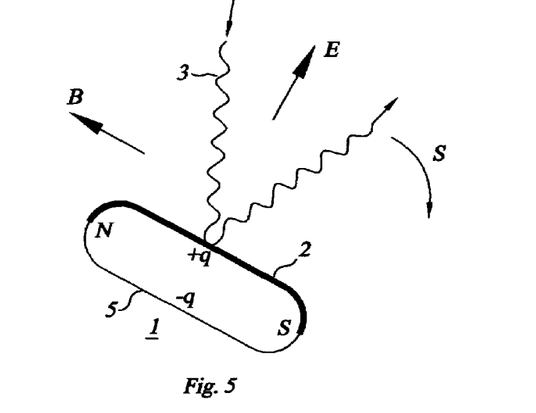
FIG. 5 is a cross-sectional view of a circular disk with a frontside reflecting surface. This disk is one of a multitude of optical elements which track the sun and focus the sunlight onto a collector, and by spinning modulate the sun's energy reaching the collector.

FIG. 5 shows a rotatable element 1 of a focussing planar mini-mirror with a frontside reflecting surface 2 which reflects a light ray 3. The reflecting surface 2 preferably reflects on both sides. The element 1 shown is a cross sectional view of a circular disk 5, with rounded edges that is operated in any of the well-known modes, such as gyricon, electrical monopolar, magnetic, polar gradient, etc. This disk 5 is one of a multitude of optical elements 1 which track the sun and focus the sun's rays onto a collector by means of an electric field E or magnetic field B, or combination thereof.

The case is illustrated where two-axis control is possible in mutually orthogonal directions by means of embedded charge +q and −q at top and bottom, and embedded magnetic field with north magnetic field N at one end and south magnetic field S in the other as shown. Two-axis control can also be accomplished with either an E or B field singly. Once the primary orientation of each reflecting surface 2 is determined, the direction of the electric field can be rapidly rotated about the primary orientation causing the elements 1 to spin as shown by the curved arrow labeled S. Similarly inversion of the geometry from that shown for the electric and magnetic dipoles and the E and B fields, permits spin S in the direction shown by rapid rotation of the magnetic field.

Figure 6:
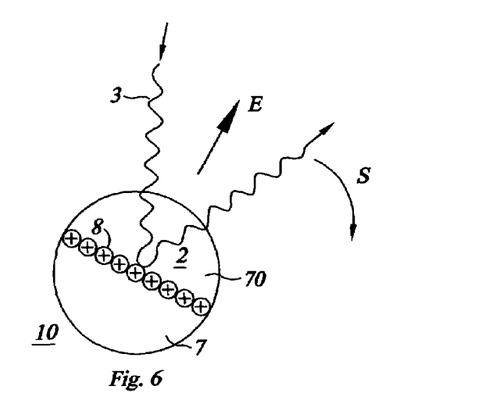
FIG. 6 is a cross-sectional view of a monopolar electric cell filled with two immiscible fluids, and shiny charged particles of the same sign in the bottom one. This cell is one of a multitude of optical elements which track the sun and focus the sunlight onto a collector, and by spinning modulate the sun's energy reaching the collector.

FIG. 6 shows a fixed element 10 of a focussing planar mini-mirror which is a cross-sectional view of a monopolar electric cell 2 partially filled with a bottom fluid 7 with shiny charged particles 8 all of the same sign (shown here as +, but which could also all be −), and a top transparent fluid 70. The two fluids are immiscible. When an electromagnetic field E is applied, the particles 8 coalesce to form a flat reflecting surface at the interface between fluid 7 and fluid 70, as also influenced by surface tension and meniscus. Fluid 70 could be air, but a transparent fluid of substantially the same index of refraction as fluid 7 is preferred. If the particles 8 are small enough to form a colloidal suspension, the density of the particles 8 and the fluid 7 may differ. However, it is generally preferable to have the density of the particles 8 approximately matched to the fluid 7.

The orientation of this flat reflecting surface can be controlled by E to reflect light 3. This cell 2 is one of a multitude of optical elements 1 which track the sun and focus the sunlight onto a collector. The particles 8 may include a wide variety of electromagnetically interactive materials such as electret, optoelectric, conducting, thermoelectric, electrophoretic, resistive, semiconductive, insulating, piezoelectric, magnetic, ferromagnetic, paramagnetic, diamagnetic, or spin (e.g. spin glass) materials. Once the primary orientation of each reflecting surface 2 is determined, the direction of the electric field can be rapidly rotated about the primary orientation causing the elements 1 to spin as shown by the curved arrow labeled S.

Until the electric field E is applied, as an optional capability the particles 8 and the fluid 7 can function as an oscillating transparent window when the particles 8 are nanosize i.e. much smaller than the wavelength of the incident light and the fluid 7 is approximately transparent or translucent while they are dispersed in the fluid 7 . For the case of dispersed transparency, the particles 8 should be <<4000 Å ($4 \times 10^{-7}$ m). In this configuration, the intensity of the incident light reflected to the collector can be modulated by opening and closing the reflecting surface in response to an electric field E that oscillates in magnitude. This is a non-spinning mode for modulation of the power output of the photovoltaic collector.

Figure 7:
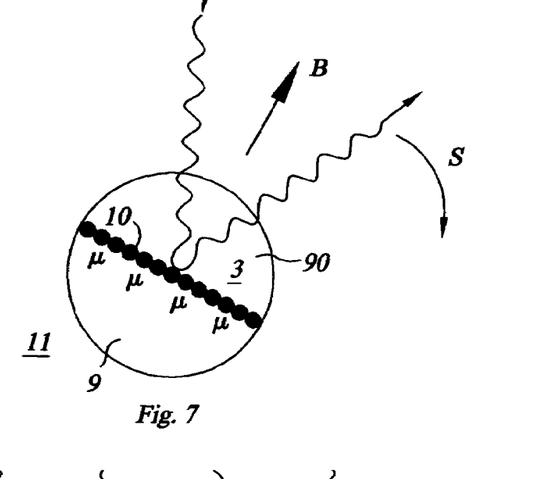
FIG. 7 is a cross-sectional view of a ferrofluid cell partially filled with a colloidal suspension of shiny ferromagnetic particles in a fluid. This cell is one of a multitude of optical elements which track the sun and focus the sunlight onto a collector, and by spinning modulate the sun's energy reaching the collector.

FIG. 7 shows a fixed element 11 of a focussing planar mini-mirror which is a cross-sectional view of a ferrofluid cell 3 partially filled with a ferrofluid 9 containing shiny ferromagnetic particles 10 of high permeability, shown here as μ, and a top transparent fluid 90. The two fluids are immiscible. When an inhomogeneous electromagnetic field B of increasing gradient is applied, the particles 10 are drawn to the region of increasing gradient and coalesce to form a flat reflecting surface at the interface between fluid 9 and fluid 90, as also influenced by surface tension and meniscus. Fluid 90 could be air, but a transparent fluid of substantially the same index of refraction as fluid 9 is preferred. If the particles 10 are small enough to form a colloidal suspension, the density of the particles 10 and the fluid 9 may differ. However, it is generally preferable to have the density of the particles 10 approximately matched to the fluid 9. The orientation of the flat reflecting surface can be controlled by B to reflect light 3. This cell 3 is one of a multitude of optical elements 1 which track the sun and focus the sunlight onto a collector. The particles 10 are preferably small enough to form a colloidal suspension, and are coated to prevent coalescence until B is applied, as is well known in the art. Once the primary orientation of each reflecting surface 2 is determined, the direction of the electric field can be rapidly rotated about the primary orientation causing the elements 1 to spin as shown by the curved arrow labeled S.

Until the magnetic field B is applied, as an optional capability the particles 10 and the fluid 9 may possibly function as an oscillating transparent window when the particles 10 are nanosize i.e. much smaller than the wavelength of the incident light and the fluid 9 is approximately transparent or translucent while they are dispersed in the fluid 9 . For the case of dispersed transparency, the particles 9 should be <<4000 Å ($4 \times 10^{-7}$ m). In this configuration, the intensity of the incident light reflected to the collector can be modulated by opening and closing the reflecting surface in response to a magnetic field B that oscillates in magnitude. This is a non-spinning mode for modulation of the power output of the photovoltaic collector.

Figure 8:
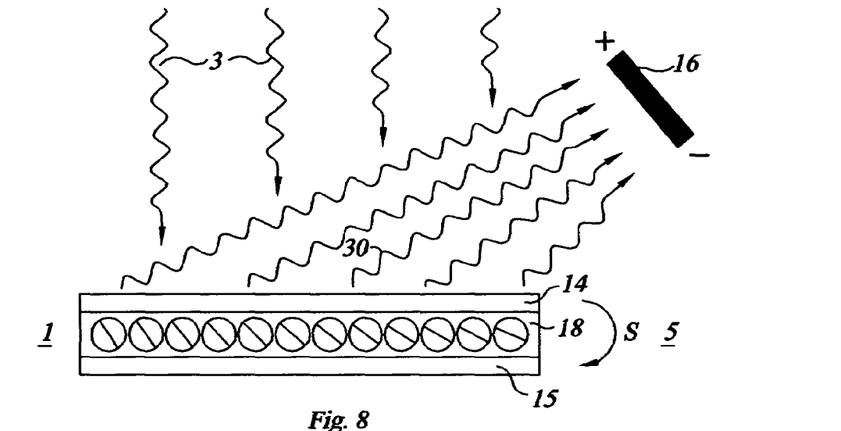
FIG. 8 is a cross-sectional view of a mini-optics ensemble of modulation spinning balls with an overlay of a transparent ground plane on top and a resistive grid on the bottom to locally produce varying mini-electric fields for orienting the mini-mirrors to focus the incident light onto a collector.

FIG. 8 is a cross-sectional view of a mini-optics ensemble 5 of an array of spinning reflecting elements 1 with elastomer sheets containing an overlay of a transparent ground plane 14 on top and a resistive grid 15 on the bottom to locally produce varying mini-electric fields for orienting the elements 1 to focus the incident light 3 as concentrated light of the rays 30 onto a photovoltaic collector 16. The elements 1 with rotatable reflecting surfaces can be situated in ridged cells between the two elastomer sheets 14 and 15. For spherical or cylindrical elements 1, ridged cellular structure is conducive but not necessary to hold the elements in grid position in the array structure.

Once the primary orientation of each reflecting surface 2 is determined, the direction of the electric field can be rapidly rotated about the primary orientation causing the elements 1 to spin as shown by the curved arrow labeled S. In the case of spinning elements 1, rapid spin is augmented by the presence of a low viscosity fluid 18. It is desirable to utilize a fluid 18 whose index of refraction matches the elements 1 and the elastomer sheets 14 and 15. The fluid 18 acts as a lubricant to permit the elements 1 to spin freely.

Ridged cells can be created in thermoplastic elastomer sheets 14 and 15 by heating the sheets to a slightly elevated temperature and applying pressure with the elements 1 between the sheets 11. In the case of elements 1 of disk shape 5, the ridged cells can be created on each sheet individually. This gives twice the height for the cells, when two such sheets are put together to hold the elements 1.

A presently preferred maximum for the diameter of elements 1 is ~10 mm. The minimum diameter of elements 1 can be assessed from the Rayleigh limit $$d = \frac{0.61 \lambda}{n \sin u} \sim 10 \lambda,$$

where d is the minimum diameter of elements 1, $\lambda$~4000 Å is the minimum visible wavelength, n is the index of refraction ~1 of element 1 (the medium in which the incident light is reflected), and u is the half angle admitted by elements 1. Thus d~40,000 Å ($4 \times 10^6$ m=4 microns) is the minimum diameter of elements 1

If the focussing planar mini-mirrors concentrate the solar radiation by a factor of 100, the total increase in power density reaching the collector would be 100 times greater than the incident power of the sun. Thus the collector area need be only ~1% the size of one receiving solar radiation directly. Although the total capital and installation cost of this improved system may be more than 1% of a direct system, there will nevertheless be substantial savings. In the case of a 100 to 1 power density enhancement at the collector, spinning of the elements 1 produces 100 times maximum power over that produced by direct incidence of light onto the collector. In this case, the dc offset of a photovoltaic collector would only be ~1% of the maximum voltage.

The flexible ensemble of elements 1 can easily have a proper calibration of their individual orientations on any surface. Prior to spinning, and preferably with the sun overhead on a clear day, the orientation of the balls can be adjusted to maximize the dc output of the collector. The balls may be individually oriented, or groups of balls may be collectively oriented to simplify tracking and focussing. When groups are collectively oriented, as a group they may have a projected group concavity to aid in the focussing to the collector. Thereafter, the reflecting surface of the balls can concurrently track the sun for main orientation, and spin or oscillate to produce ac.

The array of reflecting elements 1 may be operated in any of three tracking modes: 1. Passive or non-tracking. 2. Single-axis tracking. 3. Two-axis tracking. In the passive or non-tracking mode, a concentration enhancement of ~3 to 5 may be obtained with a concentrator to collector area ratio >~10. The main utilization in this mode is for retrofit of existing photovoltac collectors to increase their output. The main advantage here over other passive concentrator systems is that the ac production can augment the dc to ac converters, and a separate support structure is not needed—with a concomitant economic benefit. The single-axis tracking mode permits a much greater enhancement for the same concentrator to collector area ratio. Two-axis tracking achieves the greatest enhancement for the same concentrator to collector area ratio.

Figure 9:
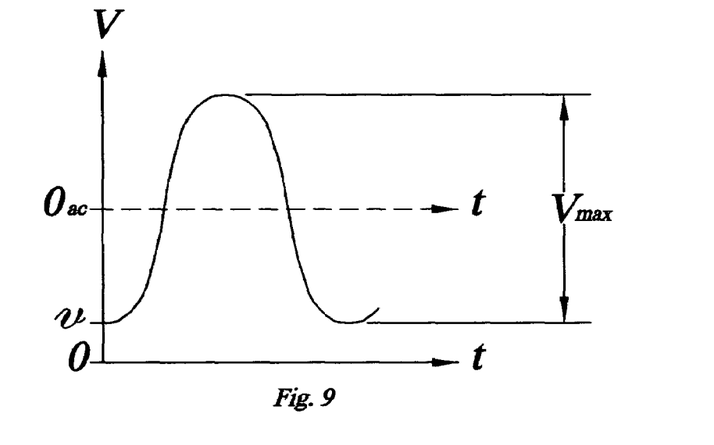
FIG. 9. shows the modulated voltage relative to the 0 voltage axis due to the spin of the balls in FIG. 8. After a negative dc bias voltage is applied, the 0 voltage axis shifts to $O_{ac}$ as shown, producing ac.

FIG. 9. shows the modulated voltage relative to the 0 voltage axis due to the modulation spinning balls in FIG. 8. A small dc offset voltage v is shown due to direct incidence of light onto the collector, which is small compared with the intensity of light from the array of reflecting elements 1. After a negative dc bias voltage [($V_{max}/2$)+v] is applied, the 0 voltage axis shifts to $O_{ac}$ as shown, producing ac. $V_{max}$ is the magnitude of the peak-to-peak modulated voltage.

Figure 10:
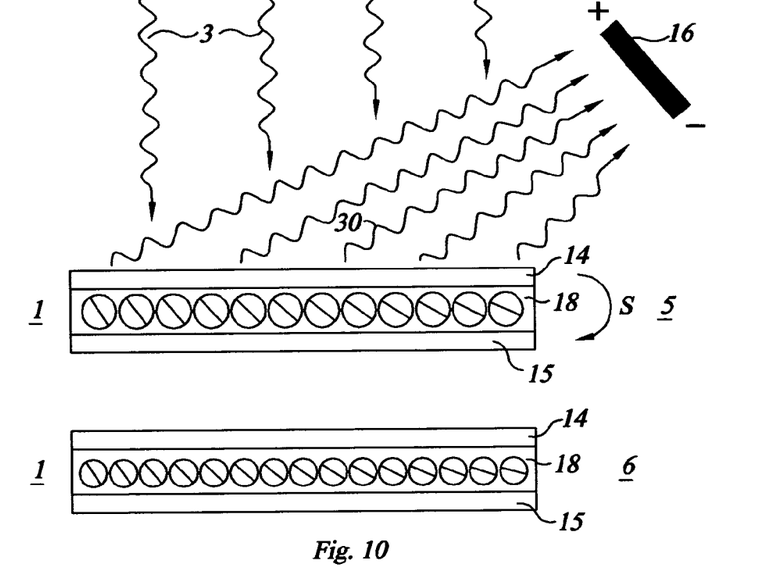
FIG. 10 shows a double array of balls with the array of voltage modulation spinning balls above and closer to the photovoltaic collector than the tracking (orientation) balls. The modulation and tracking(orientation) functions are thus decoupled.

FIG. 10 shows two arrays of balls with the array 5 of voltage modulation spinning elements (balls) 1 above the array 6 of tracking elements 1 (orientation balls), and closer to the photovoltaic collector so that the modulation and tracking(orientation) functions can be decoupled. With different radius spinning balls than tracking balls, the rate of rise and fall of the voltage can be varied. Larger spinning balls produce a steeper voltage rise and fall. Shown are cross-sectional views of mini-optics ensemble 5 and 6 with elastomer sheets containing an overlay of a transparent ground plane 14 on top and a resistive grid 15 on the bottom to locally produce varying mini-electric fields for orienting the elements 1 to focus the incident light 3 as concentrated light of the rays 30 onto a photovoltaic collector 16. The presence of a low viscosity fluid 18 facilitates rapid spinning, and low power loss tracking.

Figure 11:
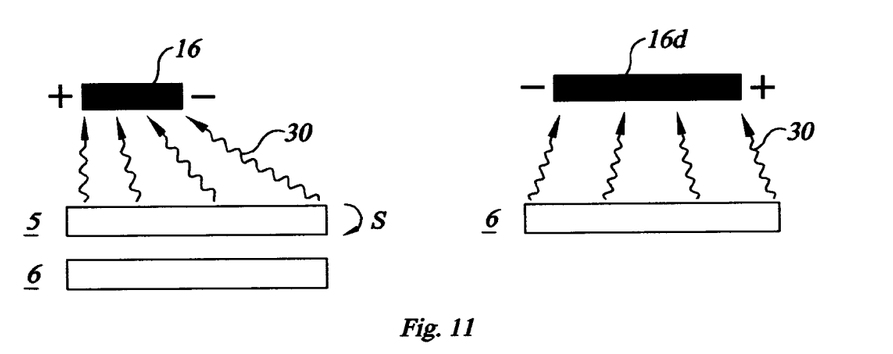
FIG. 11 on the left shows a double array of balls yielding voltage modulation and tracking, which together with a dc single array of tracking balls on the right produces ac. The dc single array of tracking balls on the right by itself produces a negative dc bias voltage.

FIG. 11 on the left shows a spinning array 5 yielding voltage modulation on top of an array 6 yielding tracking, which together with a dc single tracking array 6 on the right produces ac. The dc single tracking array 6 on the right by itself produces a negative dc bias voltage from the photovoltaic collector 16*d*. Shown are the concentrated light rays 30 focussed onto photovoltaic collector 16 from arrays 5 and 6. The concentrated light rays 30 are focussed onto photovoltaic collector 16*d* from the array 6 on the right.

Figure 12:
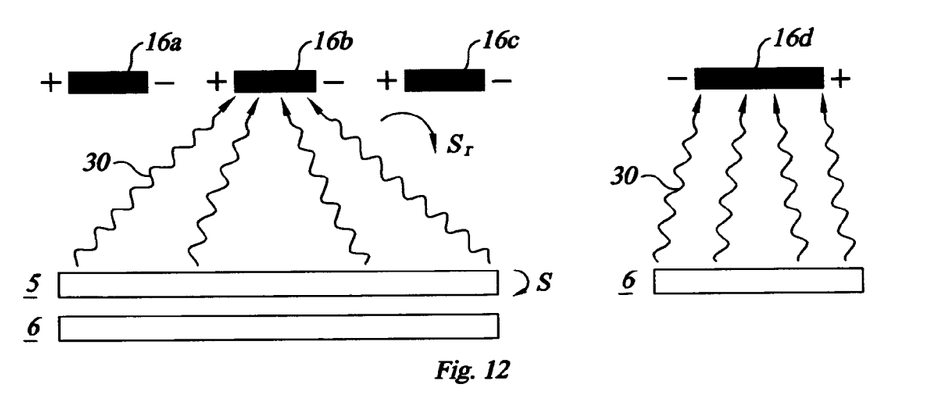
FIG. 12 on the left shows a double array of balls directing light to three spatially separated photovoltaic collectors to produce modulated 3-phase voltage. A negative dc bias voltage is created by the single array of tracking balls on the right. The combination of negative dc bias and modulated 3-phase voltage produces 3-phase ac.

FIG. 12 on the left shows a double array of balls directing light to three separated photovoltaic collectors to produce modulated 3-phase voltage. A negative dc bias voltage is created by the single array of tracking balls on the right. The combination of negative dc bias and modulated 3-phase voltage produces 3-phase ac. Shown are the concentrated light rays 30 focussed at one moment of time onto photovoltaic collector 16*b*. The rotation $S_r$ of the concentrated light rays 30 moves them sequentially from photovoltaic collector 16*a* to photovoltaic collector 16*b* to photovoltaic collector 16*c*, and back to collector 16*a*, 16*b*, 16*c*, etc. producting 3-phase voltage modulation. There can be n-phase voltage modulation with n such spatially separated collectors, which together with the negative bias voltage producing array 6 and collector 16*d* on the right results in multiphase (n-phase) ac. The collectors 16*a*, 16*b*, and 16*c* are connected in series ie. + to − to + to − to + to − to produce ac and increase efficiency as much of the previously lost light in FIG. 8 now goes to the additional collectors.

Figure 13:
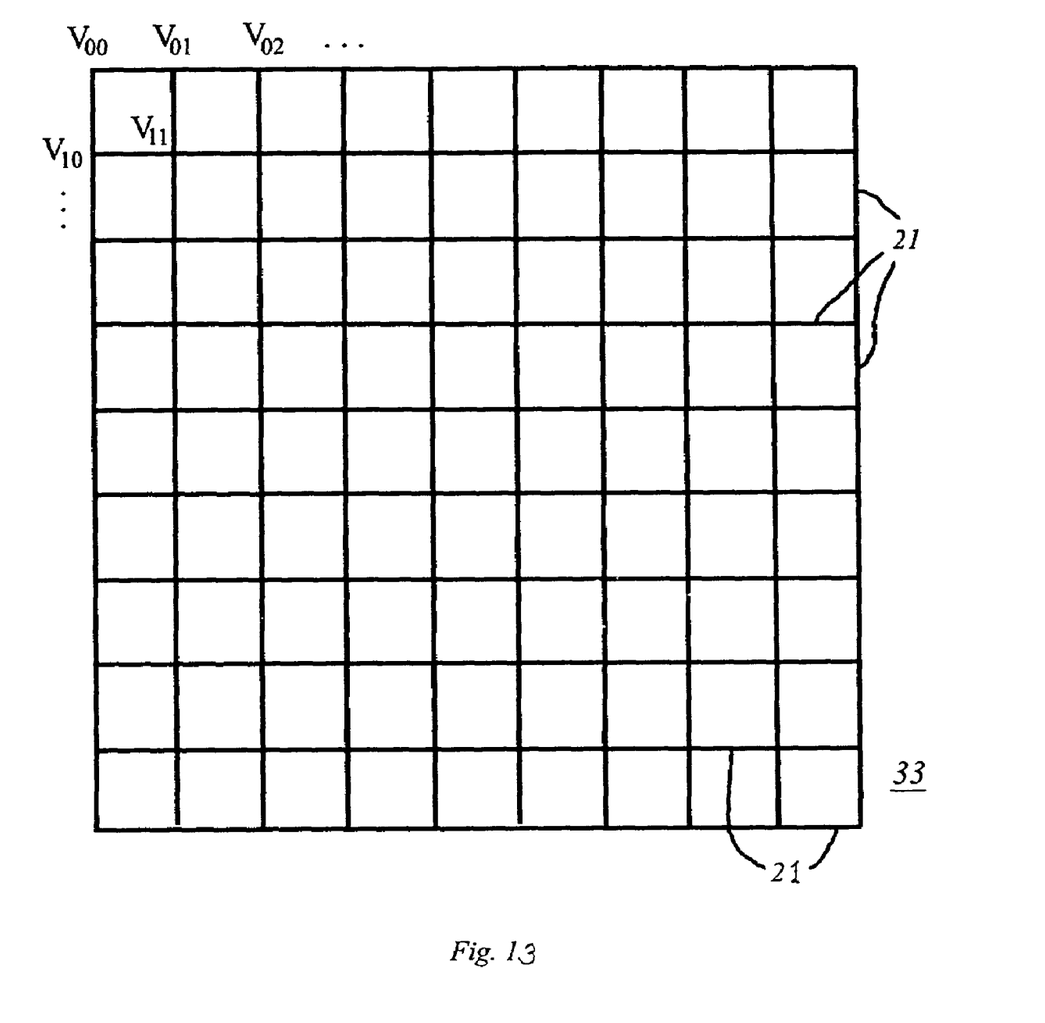
FIG. 13 is a schematic top view showing the electronic control grid for rotating the reflecting elements of a focussing planar mirror.

FIG. 13 is a schematic top view showing the electronic control grid 33 for rotating the reflecting elements 1, 10, or 11 of a focussing planar mini-mirror. Except for the cylinders of FIG. 4 which have a single-axis response, the preferred non-cylindrical geometry of each of the other elements 1, 10, or 11 is capable of rotating in any direction (two-axis response) in response to a selectively applied electric field by the electronic control grid 33. The electronic control grid 33 is made of resistive components 21. The mini-mirror array is sandwiched between the resistive electronic control grid shown here and the transparent ground plane as shown in the cross-sectional view of FIG. 8. The orientation of the elements 1, 10, or 11 (cf. FIGS. 1-7) is determined by controlling the voltages V at the nodes of the grid such as those shown $V_{00}$, $V_{01}$, $V_{02}$, $V_{10}$, $V_{11}$ with voltage $V_{ij}$ at the ij th node. The voltage $V_{ij}$ can be controlled by a very small inexpensive computer with analog voltage ouputs. Once in operation, this system can be powered by the solar energy conversion device which collects the concentrated light. The electronic control grid 33 is similar in construction and function to analogous grids used in personal computer boards, and in flat panel monitors. Similarly, small current loops around each cell provide local magnetic fields for the orientation function of elements with magnetic dipoles.

The voltage between successive nodes produces an electric field in the plane of the planar mini-mirror, and the voltage between a node and the ground plane produces an electric field perpendicular to the planar mini-mirror to control the orientation angle of the reflecting/focussing mini-mirrors, and can be varied to provide spin with a given orientation. The number of elements 1, 10, or 11 per grid cell is determined by the degree of focussing desired: the higher the degree of focussing, the fewer the number of elements per grid cell. In the case of elements 1 which contain orthogonal electrical and magnetic dipoles as in FIG. 7, the orientation function may be separated for orientation in the plane and orientation perpendicular to the plane by each of the fields. Or the orientation and spin functions may be separately controlled by the electric and magnetic fields.

While the instant invention has been described with reference to presently preferred and other embodiments, the descriptions are illustrative of the invention and are not to be construed as limiting the invention. Thus, various modifications and alternate applications may occur to those skilled in the art without departing from the true spirit and scope of the invention as summarized by the appended claims.

The invention claimed is:

1. A miniature optics system for generating alternating current directly by concentrating and modulating reflected light from a light source, comprising:
   (a) an array of miniature rotatable reflectors positioned in the space between two sheets holding said array of miniature reflectors;
   (b) the top sheet of said two sheets being transparent;
   (c) means to individually rotate the array of reflectors within said sheets;
   d) a dipole embedded in each reflector for coupling to at least one of the sheets;
   (e) means to individually track said light source and focus its light onto a photovoltaic collector; and
   (f) means to spin said reflectors at a rate in excess of 1 revolution per second for the direct production of alternating current.

2. The apparatus of claim 1, wherein each rotatable miniature reflector is a ball comprising:
   (a) a reflector embedded in said ball; and
   (b) charge of opposite sign in each said ball.

3. The apparatus of claim 1, wherein each said rotatable miniature reflector is a ball comprising:
   (a) a reflector embedded in said ball; and
   (b) a magnetic dipole in each said ball.

4. The apparatus of claim 1, wherein each said rotatable miniature reflector is a disk comprising:
   (a) a reflector on one of the surfaces of said disk; and
   (b) bipolar charge in each disk.

5. The apparatus of claim 1, wherein each said rotatable miniature reflector is a disk comprising:
   (a) a reflector on one of the surfaces of said disk; and
   (b) a magnetic dipole embedded in said disk.

6. The apparatus of claim 1, wherein each said rotatable miniature reflector is a disk comprising:
   (a) a reflector on one of the surfaces of said disk; and
   (b) a magnetic dipole and an electric dipole embedded in said disk.

7. The apparatus of claim 1, wherein the diameter of each said rotatable miniature reflector is in the range $4 \times 10^{-6}$ m to $10^{-1}$ m.

8. A miniature optics system for generating alternating current directly by concentrating and modulating reflected light from a light source, comprising:
   (a) an first array of spinable miniature reflectors positioned in the space between two sheets;
   (b) a second array of rotatable miniature reflectors to produce a dc bias voltage;
   (c) means for rotating said rotatable miniature reflectors;
   (d) means for tracking the source of light;
   (e) means for focusing said second array onto a collector; and
   (f) an electronic control grid for spinning said first array of miniature reflectors at a rate in excess of 1 revolution per second for the direct production of alternating current.

9. The apparatus of claim 8, wherein spatially separated collectors produce multiphase alternating current.

10. An optics system for generating alternating current directly by concentrating and modulating reflected light from a light source, comprising:
    (a) an array of rotatable mirrored elements positioned in lubricated cells between two sheets holding said array of mirrored elements;
    (b) the top sheet of said two sheets being transparent;
    (c) electromagnetic means to individually rotate the array of elements within said sheets;
    d) electromagnetic means for coupling to at least one of the sheets;
    (e) means to individually track said light source and focus its light onto a photovoltaic collector; and
    (f) microprocessor means to spin said elements at a rate in excess of 1 revolution per second for the direct production of alternating current.

11. The apparatus of claim 10, wherein each said element is a disk comprising:
    (a) a reflector on one of the surfaces of said disk; and
    (b) bipolar charge in each disk.

12. The apparatus of claim 10, wherein each said element is a cylinder comprising a mirror embedded in said cylinder.

13. An optics system for generating alternating current directly by concentrating and modulating reflected sunlight, comprising:
    (a) an array of rotatable mirrored elements;
    (b) each of said elements positioned in a lubricated cell;
    (c) electromagnetic means for coupling to said elements;
    (d) electromagnetic means to individually rotate said elements in said cells;
    (e) an electronic control grid;
    (f) microprocessor rapid input to said electronic control grid to spin said elements at a rate in excess of 1 revolution per second for the direct production of alternating current; and
    (g) at least one receiver for energy conversion of the concentrated and modulated sunlight.

14. The apparatus of claim 13, wherein said receiver is a photovoltaic collector.

15. The apparatus of claim 13, wherein said concentrating reflected sunlight produces alternating current power.

16. The apparatus of claim 13, wherein spatially separated receivers produce multiphase alternating current power.

17. A system for generating alternating current directly by concentrating and modulating reflected sunlight, comprising
    (a) a first array of rotatable mirrors;
    (b) each of said mirrors positioned in a cell;
    (c) a second array of rotatable mirrors;
    (d) each of second array of said mirrors positioned in a cell;

(e) means for rotating said rotatable mirrors;
(f) means for tracking the source of light;
(g) means for focusing said mirrors onto an energy conversion receiver; and
(h) microprocessor means for spinning said rotatable mirrors at a rate in excess of 1 revolution per second.

18. The apparatus of claim 17, wherein a third array of rotatable reflectors makes a negative bias voltage to combine with the first and second arrays to produce alternating current power.

19. The apparatus of claim 17, wherein spatially separated receivers produce multiphase alternating current.

20. The apparatus of claim 17, wherein spatially separated receivers produce multiphase alternating current.

21. An optics system for generating alternating current directly by modulating and reflecting concentrated light from a light source, comprising:
(a) an array of rotatable planar mirrored elements positioned in lubricated cells between two sheets holding said array of mirrored elements;
(b) the top sheet of said two sheets being transparent;
(c) electromagnetic means to individually rotate the array of elements within said sheets;
d) electromagnetic means for coupling to at least one of the sheets;
(e) means to individually track said light source and focus its light onto a photovoltaic collector;
(f) an electronic control grid; and
(g) rapid input from a microprocessor to said electronic control grid for spinning said rotatable mirrors at a rate in excess of 1 revolution per second.

22. The apparatus of claim 21, wherein another array of rotatable mirrors makes a negative bias voltage to combine with the first and second arrays to produce alternating current power.

* * * * *